Dec. 1, 1931.   F. A. CANON ET AL   1,834,679
PROCESS OF CONTROLLING TEMPERATURES OF VAPOR PHASE CATALYTIC REACTIONS
Filed July 31, 1928
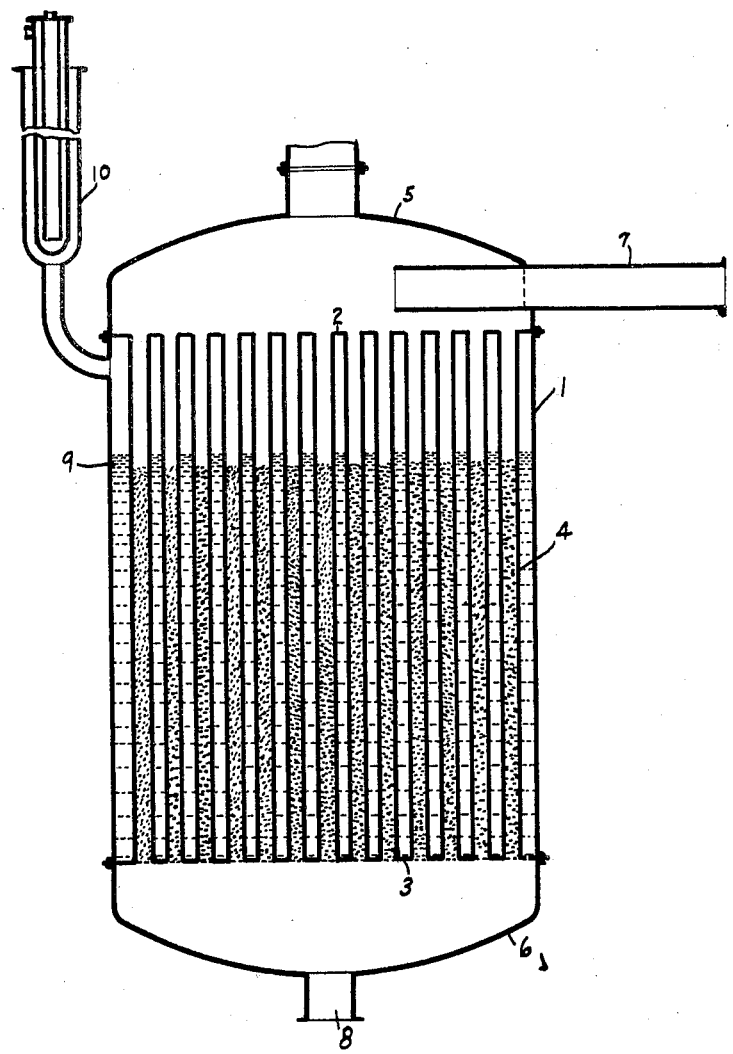
Inventors
Frank A. Canon
Chester E. Andrews
By Robert Ames Norton
Attorney Patented Dec. 1, 1931

1,834,679

UNITED STATES PATENT OFFICE

FRANK A. CANON, OF CRAFTON, AND CHESTER E. ANDREWS, OF CARNEGIE, PENNSYLVANIA, ASSIGNORS, BY MESNE ASSIGNMENTS, TO THE SELDEN RESEARCH & ENGINEERING CORPORATION, OF PITTSBURGH, PENNSYLVANIA, A CORPORATION OF DELAWARE

PROCESS OF CONTROLLING TEMPERATURES OF VAPOR PHASE CATALYTIC REACTIONS

Application filed July 31, 1928. Serial No. 296,579.

This invention relates to a process for carrying out catalytic reactions, and more particularly to a process for controlling the temperature of catalytic reactions by the latent heat of vaporization of metallic baths.

Many catalytic reactions, such as oxidations of organic compounds, for example naphthalene to phthalic anhydride, benzol, phenol and tar phenols to maleic acid, substituted and unsubstituted side chain aromatic compounds such as toluols, xylenes, etc., to the corresponding aldehydes and acids, aromatic hydrocarbons to quinones, such as benzol to benzoquinones, naphthalene to alphanaphthaquinone, anthracene to anthraquinone, phenanthrene to phenanthraquinone, acenaphthene or acenaphthylene to acenaphthaquinone and the like, phenanthrene to diphenic acid, phthalic anhydride and maleic acid, acenaphthene and acenaphthylene to bisacenaphthylidenedione, naphthaldehydic acid, naphthalic anhydride and hemimellitic acid, fluorene to fluorenone, isoeugenol to vanillin and vanillic acid, cresol and its analogues to salicylaldehyde and salicylic acid and their analogues, heterocyclic compounds such as furfural to maleic and mesotartaric acid, aliphatic alcohols such as methyl alcohol to aldehydes such as formaldehyde, ethylenechlorhydrine to chloracetic acid, and the like, require a very careful temperature control in order to prevent undesired side reactions and losses by total combustion, which easily take place as the reactions are in unstable equilibrium and tend to proceed too far because of great exotherm.

Other vapor phase catalytic reactions, such as the purification of organic compounds, for instance crude polynuclear aromatic compounds such as crude anthracene, crude phenanthrene, crude acenaphthene, crude anthraquinone, crude naphthalene or crude mononuclear aromatic hydrocarbons by selective oxidation of undesired impurities, such as, for example, carbazole in the case of crude anthracene, likewise require a careful temperature control and control of the exotherm evolved, as does the catalytic purification of byproduct ammonia by oxidation of organic impurities or sulfur compounds. A similar careful temperature control is necessary in many reductions, hydrogenations, synthesis of ammonia, oxidation of ammonia, catalytic molecular associations and the like.

Another class of reactions where accurate temperature control is very desirable is the transformation of polycarboxylic acid substances into monocarboxylic acid substances, such as, for example, the transformation of phthalic anhydride or derivatives of phthalic anhydride, such as esters, substituted phthalic anhydrides and the like into benzoic acid or benzaldehyde or their derivatives containing the oxomethylbenzene group, the reaction taking place in the presence of steam or in the presence of reducing gases such as hydrogen and the like or in the presence of both.

In the past naphthalene has been oxidized to phthalic anhydride in converters in which a boiling mercury bath has been used as a cooling or temperature regulating means. The regulation of the boiling bath is very exact as the temperature is automatically maintained so long as any liquid remains. Mercury, however, possesses a number of very serious objections. In the first place its boiling point, 357° C., is too low for many catalytic reactions, and in the second place, mercury is very expensive when figured by volume, costing in excess of $100.00 a gallon. In order to avoid the disadvantages of the low boiling temperature of mercury it has been permitted to boil under a predetermined pressure, and while this permits obtaining higher temperatures the added disadvantage of operating under pressure with a toxic vapor such as mercury is encountered, and, of course, the cost is in no sense reduced.

According to the present invention vapor phase catalytic reactions, and particularly oxidations of organic compounds, are carried out in the presence of an alloy of mercury which has a boiling point between that of mercury and the lowest boiling alloying metal. A great many alloys of mercury which can be used, because of low cost, satisfactory boiling temperatures, alloys containing mercury and lead, with or without other alloy metals, constitute the preferred embodiment of the present invention. We have found that alloys containing mercury, lead and cadmium are particularly effective for obtaining higher temperatures, especially temperatures above 430° C., alloys containing mercury and lead only being preferable because of lower price, for temperatures below 435° C. The invention in its broader aspects is, however, in no sense limited to alloys containing mercury, lead and cadmium. Among the alloys which can be used are binary alloys of lead and mercury. Other alloys such as alloys of mercury and tin or ternary alloys of mercury, lead and tin are also of importance. Any other alloys of mercury which possess boiling points falling within the range of temperatures at which the catalytic reactions are carried out and may be used and in its broader aspects the present invention is in no sense limited to any particular alloy of mercury.

The invention will be described in greater detail in connection with the following specific examples and in connection with the drawing.

The drawing is a vertical cross section through a typical tubular converter shown in diagrammatic form. It consists of a shell 1, upper top sheet 2, lower top sheet 3, catalyst filled tubes 4, top piece 5, bottom piece 6, gas inlet 7, gas outlet 8, bath 9 and reflux condenser 10. The operation of the converter with alloys of the present invention is as follows: The reaction gases enter through the pipe 7 into the top piece 5, pass downwardly through the tubes where they are in heat exchanging relation with the boiling bath in the empty portion of the tubes and are heated up to reaction temperatures. Thereupon they are passed through the contact mass where the reaction takes place and where the temperature is automatically controlled by the boiling bath. In strongly exothermic reactions the exotherm does not result in a corresponding increase in bath temperature but merely causes a more rapid boiling, with only a slight rise in boiling point, due to the fact that the vapors from an azeotropic mixture are richer in mercury than the bath itself, to take place. The reacted gases pass out through the bottom piece 6 and exhaust pipe 8 to suitable condensers or coolers. The vapors from the boiling bath pass up into the reflux condenser 10 where they are condensed and flow back. The reflux condenser has been shown diagrammatically as an ordinary internal water cooled condenser of standard commercial type. A converter is usually provided with more than one reflux condenser and of course is normally also provided with suitable accessories such as temperature measuring means, lagging, etc.

Example 1

A suitable phthalic anhydride contact mass, for example, vanadium oxide, on a carrier, is filled into the tubes and a mixture of naphthalene vapor and air in the proportion of 1:18 is passed over the contact mass. A bath, consisting of a mixture of mercury and lead containing 70% lead and 30% mercury surrounds the tubes. This composition boils at about 405° C. and absorbs the exotherm of the reaction by boiling the vapors being condensed in the reflux condenser and flowing back.

Example 2

A suitable carboxy splitting catalyst such as ZnO or CuO fragments is placed in the tubes of the converter and they are surrounded by a mixture of an alloy of lead and mercury containing 80% lead and 20% mercury and boiling at about 437° C. Vapors of phthalic anhydride admixed with air and steam are passed over the contact mass and sufficient heat is continuously applied to the converter to maintain the bath in a boiling condition. Good yields of benzoic acid are obtained.

Example 3

A contact mass containing a vanadate, such as manganese vanadate, suitable for the oxidation of anthracene to anthraquinone is filled into the tubes of the converter and a mixture of anthracene and air in the ratio of 1:30 is passed through the contact mass. The tubes are surrounded by an alloy containing 60% mercury, 32% lead and 8% cadmium and having a boiling point of about 388° C. The anthracene is oxidized to anthraquinone and the exotherm evolved is absorbed by the boiling bath.

Example 4

Naphthalene-air mixtures are passed over a suitable vanadium oxide contact mass in the tubes of the converter which are surrounded by an alloy containing 40% mercury, 30% lead and 30% tin, which boils at about 405° C. Good yields of phthalic anhydride are obtained.

An alloy of mercury and a metal having a boiling point higher than mercury boils under atmospheric pressure at a temperature corresponding to the composition of the alloy, which temperature is higher the greater the amount of high boiling metal.

The vapors, however, do not have the same composition as the bath itself. On the contrary, they are extremely rich in mercury; thus, for example, a bath of mercury and lead, as described in Example 2, which boils at about 437° C. gives off vapors containing less than 5% of lead. These vapors, which are of course at the temperature of the boiling point of the bath, are therefore at a temperature considerably above the boiling point of a liquid corresponding to their composition. In the case referred to, this boiling point is below 360° C.; therefore, when these vapors have given up their superheat they will condense at a temperature corresponding to the boiling point of the vapors and not the boiling point of the bath. In converters in which the vapors are used for preheating, as shown in the drawing, the incoming gases will be preheated to a temperature corresponding to the boiling point of the vapors and not the boiling point of the bath, provided, as is the case in every organic oxidation commercially used, the amount of preheating required is greater than that corresponding to the superheat of the vapors, that is to say, the heat required to reduce their temperature from the boiling point of the bath to the boiling point of the vapors, and is less than the heat corresponding to the total latent heat of the vapors. In all cases where the reaction generates more heat than is required to preheat the incoming reaction gases to the boiling point of the vapors and in which the preheating of the gases requires more heat than that corresponding to the superheat of the vapors, the operation of a boiling alloy bath is entirely different from any single elementary substance such as mercury. When mercury boils under sufficient pressure to have the same boiling point as an alloy bath, for instance in the case of Example 2 sufficient pressure to boil at 437° C., the condensing mercury vapors in preheating the incoming gases will condense at the same temperature at which the bath boils because their composition is identical with the bath composition. The gases will, therefore, be preheated to a temperature corresponding to the boiling point of the bath. The reaction gases for many organic oxidations tend to preignition at temperatures corresponding to the boiling point of the bath but do not preignite at the lower temperatures of the condensing vapors of the bath. This is particularly true in the oxidation of naphthalene to phthalic anhydride and is a notable advantage of the present invention since the shut downs due to the explosions which result from preignition are avoided. In the case of an alloy bath, as described in Example 2, the incoming gases are preheated to a temperature corresponding to the boiling point of the vapors, that is to say, less than 360° C. In the case of oxidation of naphthalene to phthalic anhydride, preignition is a frequent phenomenon when the reaction mixture is preheated to the temperature of the bath and never occurs when the reaction mixture is preheated only to the temperature corresponding to the boiling point of the vapors from an alloy bath, that is to say, 360° C. While in its broader aspects the invention is not limited to reactions in which there is danger of preignition, in its more specific aspects this is an added advantage of the process of the present invention and overcomes a further disadvantage inherent in the use of mercury boiling under pressure.

This application is in part a continuation of our copending application, Serial No. 567,740 filed June 12, 1922.

What is claimed as new is:

1. A method for controlling vapor-phase catalytic reactions which take place at temperatures above the boiling point of mercury at atmospheric pressure, which comprises causing the reactions to take place in heat exchanging relation with a bath of an alloy of mercury with at least one metal having a boiling point higher than that of mercury, the bath being maintained in a boiling condition and thereby controlling the temperature of reaction, the vapors being brought in heat exchanging relation with the incoming reaction gases whereby the latter are preheated, the total amount of heat in the vapors evolved from the bath being greater than that required to preheat the incoming reaction gases to the temperature corresponding to the boiling point of the bath vapors and the amount of the bath vapors being less than that sufficient to preheat all of the incoming reaction gases to the temperature of the boiling point of the vapors by cooling the vapors of the boiling bath from the temperature of the bath to the boiling point of the vapors, whereby the incoming reaction gases are preheated automatically to a temperature corresponding to the boiling point of the vapors from the bath and being therefore preheated to a temperature materially lower than that corresponding to the temperature of the boiling bath.

2. A method according to claim 1, in which the boiling bath is an alloy containing lead and mercury.

3. A method according to claim 1, in which the boiling bath is an alloy consisting of lead and mercury.

4. A method according to claim 1, in which the reaction is a partial oxidation of an organic compound.

5. A method according to claim 1, in which the reaction mixture tends to preignite at temperatures corresponding to the boiling point of the bath but is substantially free from preignition at temperatures corresponding to the boiling point of the vapors of the bath.

6. A method according to claim 1, in which the catalytic reaction is the partial oxidation of naphthalene to phthalic anhydride.

7. A method according to claim 1, in which the reaction is the partial oxidation of naphthalene to phthalic anhydride and the boiling bath is an alloy containing lead and mercury.

8. A method according to claim 1, in which the reaction is the partial oxidation of naphthalene to phthalic anhydride and the boiling bath consists of lead and mercury.

Signed at Pittsburgh, Pennsylvania, this 20th day of July, 1928.

FRANK A. CANON.
CHESTER E. ANDREWS.